(12) United States Patent  
Boillot et al.

(10) Patent No.: US 7,834,847 B2  
(45) Date of Patent: Nov. 16, 2010

(54) METHOD AND SYSTEM FOR ACTIVATING A TOUCHLESS CONTROL

(75) Inventors: Marc Boillot, Plantation, FL (US); Jason McIntosh, Sugar Hills, GA (US)

(73) Assignee: NaviSense, Plantation, FL (US)

( * ) Notice: Subject to any disclaimer, the term of this patent is extended or adjusted under 35 U.S.C. 154(b) by 753 days.

(21) Appl. No.: 11/566,156

(22) Filed: Dec. 1, 2006

(65) Prior Publication Data

US 2007/0125633 A1 Jun. 7, 2007

Related U.S. Application Data

(60) Provisional application No. 60/741,359, filed on Dec. 1, 2005.

(51) Int. Cl.
*G09G 5/00* (2006.01)
*G06F 3/041* (2006.01)

(52) U.S. Cl. ..................... 345/156; 345/173

(58) Field of Classification Search ............. 345/173, 345/156
See application file for complete search history.

(56) References Cited

U.S. PATENT DOCUMENTS

| | | | |
|---|---|---|---|
| 5,274,363 A | 12/1993 | Koved | |
| 5,864,334 A * | 1/1999 | Sellers | 345/168 |
| 6,130,663 A | 10/2000 | Null | |
| 6,137,427 A | 10/2000 | Binstead | |
| 6,313,825 B1 * | 11/2001 | Gilbert | 345/156 |
| 6,937,227 B2 | 8/2005 | Qamhiyah | |
| 7,078,911 B2 | 7/2006 | Cehelnik | |
| 7,081,884 B2 | 7/2006 | Kong | |
| 7,092,109 B2 | 8/2006 | Satoh | |
| 7,130,754 B2 | 10/2006 | Satoh | |
| 2006/0092022 A1 | 5/2006 | Cehelnik | |
| 2006/0161871 A1 | 7/2006 | Hotelling | |
| 2006/0256090 A1 | 11/2006 | Huppi | |

* cited by examiner

*Primary Examiner*—Bipin Shalwala
*Assistant Examiner*—Jonathan Boyd

(57) ABSTRACT

A system (100) and method (160) for activating a touchless control is provided. The method can include detecting (162) a movement of a finger in a touchless sensing field, identifying (164) an activation cue in response to the finger movement, and activating (166) a touchless control of an object in response the activation cue. The method can include focusing the touchless sensing field (210) to produce a touchless projection space (220). An activation cue can be a positioning of a finger (302) within a bounded region (304) of the touchless projection space for a pre-determined amount of time. In one arrangement, cursor (124) navigation and control can be provided in accordance with touchless finger movements.

20 Claims, 10 Drawing Sheets

ACTIVATION CUES TO ENABLE CONTROL

| FORWARD ACCELERATED FINGER MOVEMENT | — 390 |

| DOWNWARD ACCELERATED FINGER MOVEMENT | — 392 |

ACTIVATION CUES TO DISABLE CONTROL

| BACKWARD ACCELERATED FINGER MOVEMENT | — 394 |

| UPWARD ACCELERATED FINGER MOVEMENT | — 396 |

METHOD AND SYSTEM FOR ACTIVATING A TOUCHLESS CONTROL

CROSS-REFERENCE TO RELATED APPLICATIONS

This application claims the priority benefit of U.S. Provisional Patent Application No. 60/741,359 entitled "Method and System for Activating a Control" filed Dec. 1, 2005, the entire contents of which are hereby incorporated by reference. This application also incorporates by reference the following Utility Applications: U.S. patent application Ser. No. 11/559,295, entitled "Method and System for "Directing a Control Action", filed on Nov. 13, 2006, U.S. patent application Ser. No. 11/562,404, entitled "Method and System for Object Control", filed on Nov. 21, 2006, U.S. patent application Ser. No. 11/562,410, entitled "Method and System for Range Measurement", filed on Nov. 21, 2006, and U.S. patent application Ser. No. 11/562,413, entitled "Method and System for Providing Sensory Feedback for Touchless Control", filed on Nov. 21, 2006. This application also incorporates by reference the following Utility Applications filed on the same day: Ser. No. 11/566,137 entitled "Method and System for Touchless User Interface Signing" filed on Dec. 1, 2006, and Ser. No. 11/556,148 entitled "Method and System for Mapping Virtual Coordinates" filed on Dec. 1, 2006.

BACKGROUND

1. Field

The present embodiments of the invention generally relates to the field of user interfaces, more particularly to touchless user interface devices.

2. Background of the Invention

Motion detectors can detect movement. Motion detection systems can include radar systems, video camera monitoring systems, outdoor lighting systems, and medical diagnostic systems. Motion detection systems generally include a sensor which converts a physical signal into an electronic signal. The sensor performs the task of capturing the signal and converting it to a suitable format for processing. A motion detection system can include a processor for interpreting the sensory information and identifying whether an object has moved.

A motion detection system can be used as a security feature in a home or building. The motion detection system can include, or connect to, a source of lighting that is activated when an object is detected. Generally, when a movement is detected, lights are turned on, and when the movement ceases the lights are turned off. A motion detection system can include a timer for establishing a time interval when the lights are turned back off.

A computer system generally includes a mouse to navigate and control a cursor on a computer display. A cursor on the screen moves in accordance with the motion of the mouse. A touchpad or stick can also be used to control the cursor on the display. The mouse, touchpad, and stick generally require physical movement to assume control of the cursor. In one example, a motion detection system can be used in place of the mouse to navigate a cursor object. However, the motion detection system detects interference motion. A need therefore exists for providing a mechanism to control motion detection sensing.

SUMMARY

One embodiments of the invention is directed to a system for touchless control. The system can include a touchless sensing unit that detects at least one activation cue from a finger in a touchless sensing field, and a controller communicatively coupled to said sensing unit, that activates a touchless control in response to said activation cue. The touchless sensing unit can further include a detector that identifies a location and movement of the finger producing the activation cue, a timer cooperatively connected to said detector, that establishes a time window of receiving said activation cue, and a processor cooperatively connected to said detector, that acquires or releases the touchless control in view of the activation cue. The system can include a display cooperatively connected to the controller, that visually presents a handle to an object under touchless control, and an indication element communicatively coupled to the detector, that informs a user that an activation cue has been identified. In one arrangement, the object can be a cursor and the handle can be a navigation and selection control of the cursor.

The touchless sensing unit can be an array of ultrasonic sensors, imaging elements, charge coupled devices (CCD), camera elements, or laser elements. In one configuration, the processor focuses the touchless sensing field to produce a touchless projection space that includes at least one boundary for activating the activation cue. The sensing unit can projects the touchless projection space away from a surface of a display, such that a center of the touchless projection space does not coincide with a center of the display.

One embodiment is a method for activating a touchless control. The method can include detecting at least one movement of a finger in a touchless sensing field, identifying an activation cue in response to the at least one finger movement, and granting touchless control of an object in response the activation cue. The method can include focusing the touchless sensing field to produce a touchless projection space, wherein the activation cue is a positioning of the finger within a bounded region of the touchless projection space. The method can further include enabling a touchless control upon identifying an activation cue within a first bounded region of a touchless projection space, and disabling the touchless control upon identifying an activation cue outside a second bounded region of the touchless projection space. The method can include detecting a length of time the finger is at a location within a bounded region, and presenting an indication when a touchless control is enabled or disabled in response to an activation cue. In one configuration, a sensitivity of the touchless projection space can be adjusted based on a position of the finger and a time length of the finger at the position. Adjusting the sensitivity can change an intensity of the touchless projection space. The step of granting touchless control can further comprise associating relative finger movements with activation cues for acquiring and releasing the touchless control.

Another embodiment is directed to a machine readable storage, having stored thereon a computer program having a plurality of code sections executable by a portable computing device. The code sections can cause the portable computing device to perform the steps of enabling a navigation control when a finger is within a first boundary region of a touchless projection space, controlling an object in accordance with a movement of at least one finger, when said finger is within said touchless projection space, disabling said navigation control when said finger is outside a second boundary region of said touchless projection space, and re-enabling said navigation control when said finger returns to a region within said first boundary, for controlling said object in accordance with said movement when said finger is within said touchless projection space. The object can remain at a position where navigation control is disabled and resume movement when the finger returns to the first boundary region. The computer program can be stored in a machine readable storage such as a hard disk, a computer memory, a flash drive, a chip, an EPROM, or the like.

The machine readable storage can further perform the steps of identifying a forward accelerated finger movement as an activation cue to enable touchless control of the object, and identifying a backward accelerated finger movement as an activation cue to disable touchless control of the object. The machine readable storage can further perform the steps of identifying a downward accelerated finger movement as an activation cue to enable touchless control of the object, and identifying an upward accelerated finger movement as an activation cue to disable touchless control of the object. The machine readable storage can further perform the steps of increasing an intensity of the touchless projection space in response to detecting a finger within the first boundary region.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION

Figure 1:
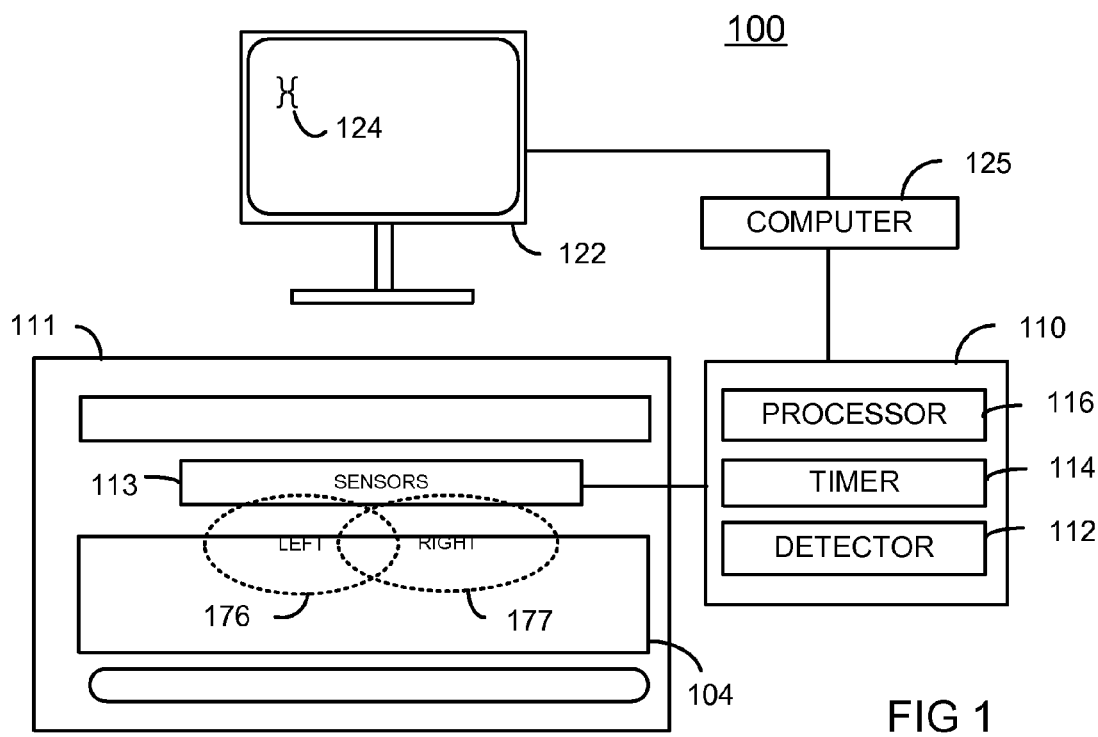
FIG. 1 is a schematic of a touchless control system in accordance with an embodiment of the inventive arrangements.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a midlet, a source code, an object code, a shared library/dynamic load library and/or other sequence of instructions designed for execution on a computer system.

The term "touchless sensing" can be defined as sensing movement without physically touching the object causing the movement. The term "touchless sensing field" can be defined as a broad region for sensing. The term "touchless projection space" can be defined as a focus, or narrowed region, of a touchless sensing field. The term "mounted" can be defined as a being attached to, connected to, part of, integrated within, associated with, coupled to, adjacent to, or near. The term "cursor" can be defined as a cursor on a display providing control to an underlying object. The cursor can be a handle to an object in the display, or a physical object remote from the display controlled using the cursor on the display. The cursor may or may not be visible. The cursor can be a handle to an object, wherein the object can be controlled via the cursor. The term "cursor object" can be defined as an object that can receive coordinate information for positioning. In one example, a cursor object can be the target of a game control for handling an object in the game. The term "activating" or "activation" can be defined as enabling, disabling, or adjusting a control. The term "activation cue" can be defined as a finger movement that imparts an operation on a control. The operation can be the initiating of the control, the termination of the control, the pausing of the control, or the adjusting of the control though is not limited to these. The activation cue can be a physical motion such as a finger movement, hand gesture, or a vocal motion such as a spoken utterance though is not limited to these. The term "cue" can be defined as an act or behavior; the act may be rehearsed or intentional. The term "bounded region" can be defined as an enclosed region.

Briefly, embodiments of the invention are directed to a system and method for activating a touchless control. The method can include detecting at least one activation cue in a touchless projection space, and activating a touchless control upon recognizing the activation cue. For example, a user can position a finger at a particular location in the touchless projection space for a predetermined length of time to activate a touchless control. In one aspect, the activation cue can enable control of a cursor or disable control of the cursor. The method can adjust a sensitivity of a touchless sensing unit for adjusting an intensity of the touchless projection space. A user can move a finger in the touchless projection space for controlling an object in accordance with the finger movement. The sensing unit can create boundaries in the touchless projection space for demarcating activation cues. Navigation and control of a cursor object can cease or resume when the finger leaves or enters the boundaries. Activating a touchless control can include disabling object control, enabling object control, or adjusting the touchless projection space.

Referring to FIG. 1 a touchless control system 100 for a computer environment is shown. The touchless control system 100 can include a keyboard 111, a computer 125, and a display 122. A sensing unit 110 can be operatively coupled to the keyboard 111 and communicatively coupled to the computer 125. An array of sensors 113, herein called an in-line sensor element, can detect finger motion above the keyboard 111. The hands or fingers do not have to be in contact with the in-line sensor element 113, nor do they have to be directly over the in-line sensor element 113. The sensing unit 110 can detect a finger above the keyboard 111 when the hands are positioned in the general typing position. The keyboard can be a computer keyboard, a mobile device keypad, a personal digital assistant keypad, a game control keypad, or a communication device keypad, but is not limited to these. The sensing unit 110 can differentiate between hand movement and finger movement.

The sensing unit 110 can include the in-line sensor element 113 for creating the touchless sensing field, a detector 112 for identifying a finger location and finger movement in the touchless sensing field, and a timer 114 for determining a time the finger is at a location or in movement. The sensing unit 110 can also include a processor 116 for creating a touchless projection space and recognizing one or more activation cues from the finger location and movement in the touchless projection space. In one configuration, the processor 116 focuses the touchless sensing field to produce the touchless projection space. The touchless projection space includes at least one boundary for activating the activation cue. Briefly, the touchless projection space can include regions 176 and 177 within which a finger can be detected. The touchless projection space is a bounded region in the touchless sensing field. Only movement within the touchless projection space is detected. The touchless sensing field can radiate in all directions from the touchless sensing unit 110. The touchless projection space is a localized region in the touchless sensing field.

Briefly, touchless control of an object is granted when a finger is within the touchless projection space. The object can be local to the program application or can be an object outside of the program application. For example, the user can control an object such as a cursor 124, a menu item, or user interface control in a program. The user interface control may be coupled to another device capable of receiving coordinate information for controlling the object. The sensing unit 110 can be used to control objects in gaming, mobile device systems, multimedia rendering engines, visual rotation systems, painting applications, simulation, media control, automotive applications, adjusting audio controls, adjusting multimedia controls, and the like.

Figure 2:
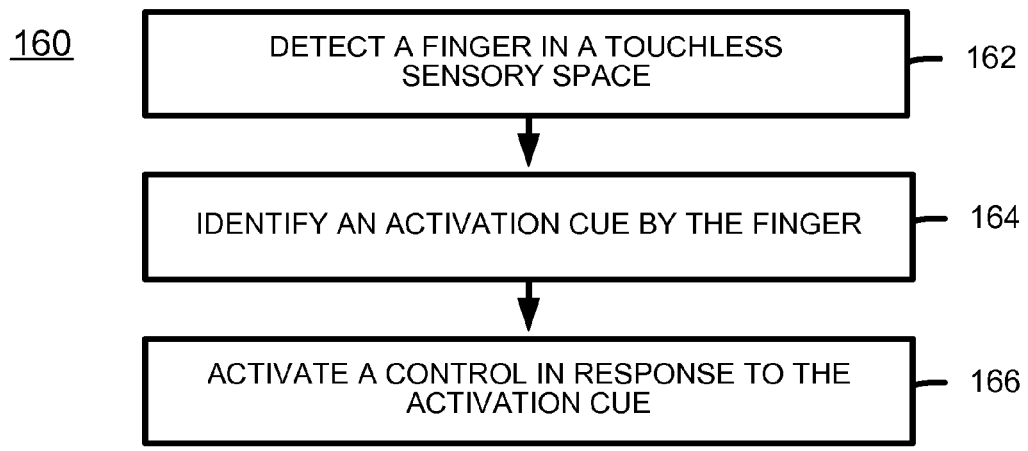
FIG. 2 is a method for activating a touchless control in accordance with an embodiment of the inventive arrangements.

Referring to FIG. 2, a method 160 for activating a touchless control is shown. The method 160 can be practiced with more or less than the number of steps shown. At step 162, a finger can be detected in a touchless projection space. Briefly, referring to FIG. 1, the in-line sensing element 113 can be positioned above the keyboard, within a mouse, or within a display projecting approximately in a direction of finger movement. The in-line sensing element 113 can be mounted to the keyboard as illustrated in FIG. 1 close to a range of finger movement. In another arrangement, the in-line sensing element 113 can attach to or dangle from the display 122. The sensing unit 110 can detect finger movement above the keyboard 111 without requiring the user to manually control an input pointing device such as a mouse, a stick, a touchpad, or, having a physical apparatus connected to the user. The sensing unit 110 can map finger motion, or hand motion, to a coordinate signal for controlling movement of an object. For example, the user can control a cursor object 124 using touchless finger movements to interact with a computer application for performing tasks such as text editing, web browsing, checking email, messaging, code programming, playing a game, or the like. In one example, the user can control a cursor within a text processing application, such as to identify where text can be entered and displayed (e.g. cut and paste). In another example, the user can control an object displayed within a program application.

Returning back to FIG. 2, at step 164, an activation cue by the finger can be identified. An activation cue can be an intentional movement, such as a raising of the finger, or a positioning of the finger at a certain location in the touchless sensing field. An activation cue may be an intentional finger movement, such as an accelerated downward finger movement or forward projecting finger movement, to acquire or release control of an object, such as the cursor 124. At step 166, a touchless control can be activated in response to the activation cue. A touchless control can be a handle to an object such as the cursor 124, or a user interface component on the display 122. Referring back to FIG. 1, the processor 116 can activate a control in response to recognizing an activation cue in the touchless projection space. As one example, the activation cue can be a touchless finger movement to acquire control of the cursor 124. For instance, the user can raise a finger above a keyboard 111 to acquire control of the cursor 124 and navigate the cursor 124 in accordance with the finger movement. The processor 116 can convert the finger location and movement to a coordinate signal. The coordinate signal can be input to a computer or other device for controlling an object or navigating a cursor object 124 on the display 122. A touchless control of the cursor 124 can include navigation, single click, double click, or scroll.

Figure 3:
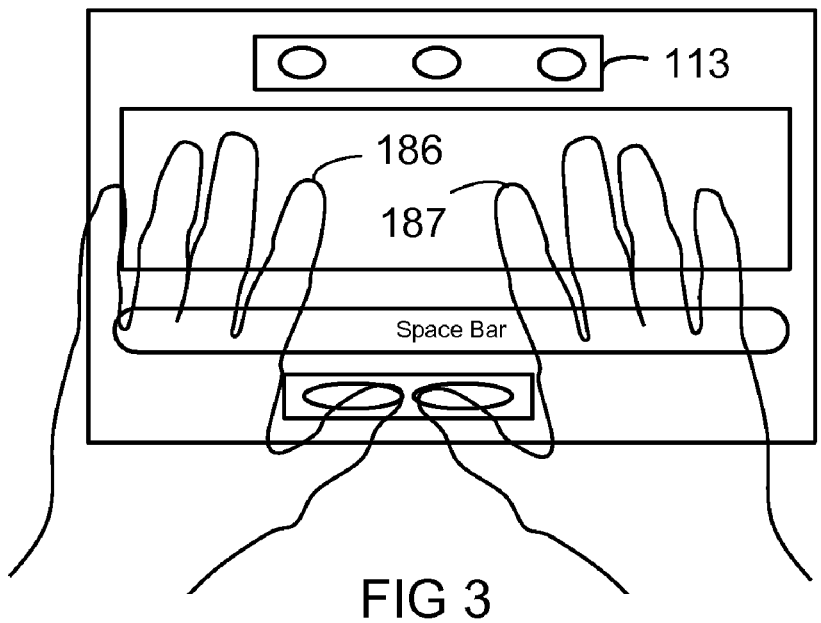
FIG. 3 is an illustration of a keyboard providing touchless control in accordance with an embodiment of the inventive arrangements.

Referring to FIG. 3, an exemplary use for touchless control is shown. A user can position two hands above the keyboard 111 for controlling a cursor object 124 within a display 122. A first finger 186 on the left hand and a second finger 188 on the right hand can control a cursor object 124 within the display 122. A user can move the first and second finger for signing motion to the computer to control the cursor object 124. For example, a single finger can produce an activation cue, or two fingers can be used to generate an activation cue. The activation cue can be the positioning of the finger at a particular location for a predetermined amount of time. The activation cue can also be a sign, such as a figure eight pattern, a circle, or a check. In such regard, the user can motion the finger to outline a sign such that the sensing unit 110 identifies the sign and interprets the sign as an activation cue. In one example, the user can control the cursor 124 using a first 187 and second finger 186. The first finger 187 can control navigational movement, and the second finger 186 can control an action on the cursor. The action can correspond to a mouse behavior such as a single click, a double click, a scroll, a left click, a middle click, a right click, or a hold operation. For example, the user can move the second finger 186 briefly up and down, or inward and outward, to perform a touchless click or button press. Using two fingers allows a user to navigate a cursor object with one finger and perform an action using a second finger. The user can leave the hands in the default typing position without having to displace one hand to activate a mouse behavior, such as a single or double click.

In one arrangement, the sensing unit 110 can track finger movement using ultrasonic pulse-echo detection. During normal typing movement, when multiple fingers are moving, the sensing unit 110 identifies incoherent movement. When the user is typing, signals are reflected off the moving fingers causing interference patterns within the sensing unit 110. The detector 112 can determine which movements are coherent and which movements are non-coherent. For example, when the user signals an activation cue to the computer, the user ceases typing and raises a single finger. The movement of the single finger may be smooth and continuous in comparison to normal typing motion where all fingers are moving. The detector 112 can identify coherent motion as an indication by the user that the user is signaling an activation cue. The detector also determines a completion of a finger motion when movement has ceased or when non-coherent motion resumes. The timer 114 can set a time window for capturing the activation cue. The processor 116 can create boundaries within the sensing field for identifying when a user is attempting to acquire control of an object and when a user is attempting to relinquish control of the object.

Figure 4:
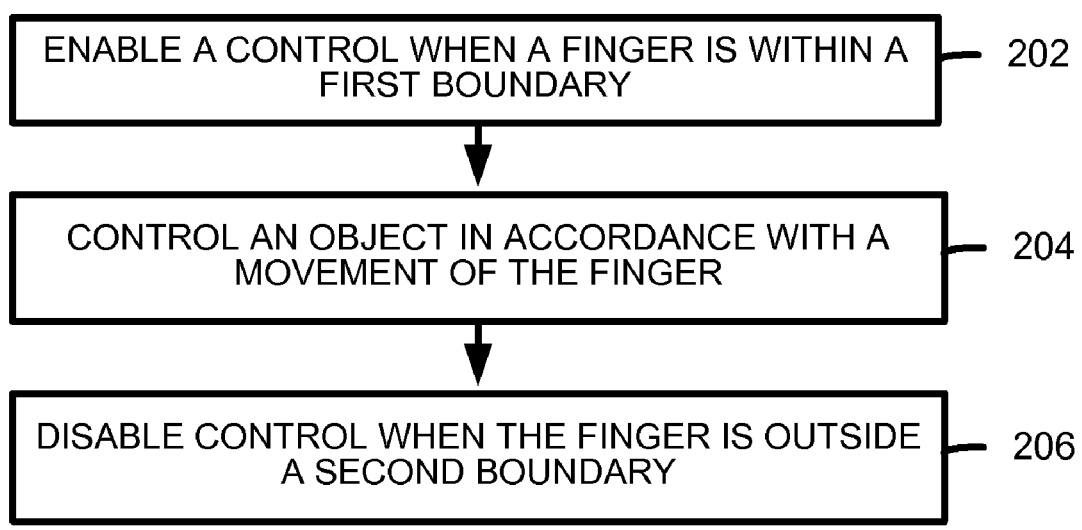
FIG. 4 is a method for enabling and disabling a touchless control in accordance with an embodiment of the inventive arrangements.

Referring to FIG. 4, a method 200 for enabling and disabling touchless control is shown. The method 200 can be practiced with more or less than the number of steps shown. Implementation aspects of method 200 are discussed ahead in FIGS. 5 and 6. In particular, a description of the sensing space and touchless projection space is presented ahead in FIG. 5. The boundaries of the touchless projection space are also discussed ahead in FIG. 6.

Referring to FIG. 4, at step 202, a control can be enabled if the finger is within a first boundary. For example, referring to FIG. 1, the processor 116 can determine when the finger is within a boundary of the touchless projection space. The processor 116 can grant control of the cursor 124 when the finger is within the first boundary. The first boundary can be in a touchless projection space created by the processor 116. Briefly referring to FIG. 6, the processor 116 can grant control of the cursor object 124 when the finger penetrates inner boundary 304. Alternatively, the processor 116 can grant control when the finger penetrates outer boundary 314. In one arrangement, granting control when the finger enters the inner boundary 304 is advantageous since the power dissipation for generating the inner sensing field is low. That is, the sensing device 110 can be kept at low power, generating a low power sensing field, until an activation cue is detected; which is the approaching of the finger in the inner boundary 304. Awaiting detection at outer boundary 314 can consume more power. Upon detecting the activation cue within inner boundary 304, the sensing unit 110 can increase the sensing field strength outward to boundary 314.

Figure 6:
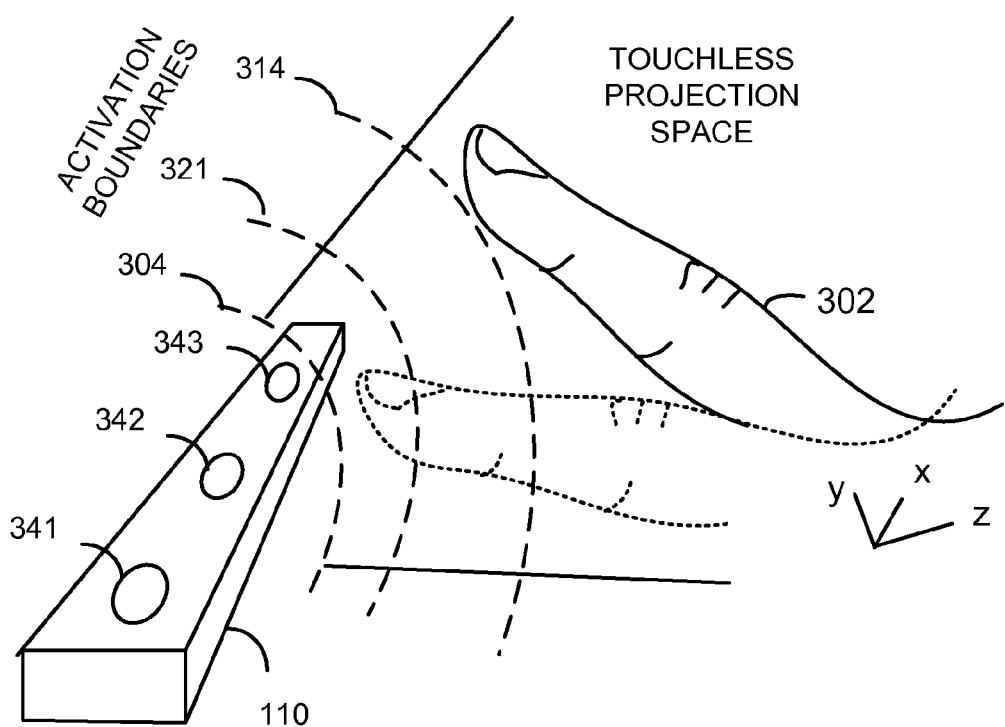
FIG. 6 is a depiction of activation boundaries in accordance with an embodiment of the inventive arrangements.

Returning back to FIG. 4, at step 204, an object can be controlled in accordance with a movement of the finger. For example, referring back to FIG. 1, the processor 116 can move the cursor 124 in accordance with the finger movement while the finger is within the touchless projection space. The processor can also identify activation cues during the finger movement, such as a forward projecting movement or downward projecting movement to select an object handled by the cursor. This allows a user to perform a single click on an object to select the object. The processor 116 can track the finger movement and control an object while the finger is within a boundary region of the touchless projection space 220. Returning back to FIG. 4, at step 206, control can be disabled when the finger is outside a second boundary. For example, referring back to FIG. 1, the processor 116 can relinquish control when the finger is outside the touchless projection space. Referring to FIG. 6, as an example, the processor 116 can determine when the finger is outside the outer boundary 314, and release control of the cursor. Alternatively, the processor 116 may detect an activation cue such as a retracting or upward accelerated movement for relinquishing control. That is, instead of waiting until the finger leaves the outer boundary 314, the processor 116 can identify an activation cue. This allows the user to immediately relinquish control, for example by rapidly moving the finger away. Also, upon detecting the activation cue, the processor 116 can reduce the strength of the sensing field to conserve power.

Figure 5:
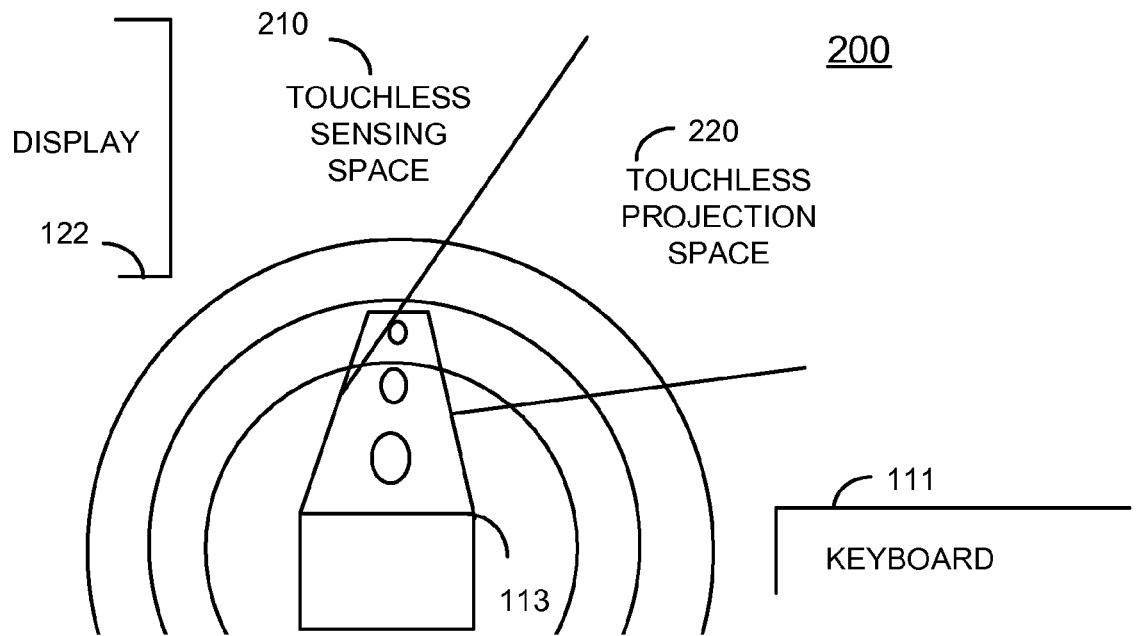
FIG. 5 is a side view of a touchless sensing space and a touchless projection space in accordance with an embodiment of the inventive arrangements.

Referring to FIG. 5, a depiction 200 of the sensing space 210 and the touchless projection space 220 created by the sensing unit 110 is shown. Briefly, the sensing space 210 is an approximately elliptical volume that emanates outward from the in-line sensing element 113. The processor 116 can narrow the sensing space 210 to a touchless projection space 220. In another arrangement, the in-line sensor 113 includes a plurality of directional transducers to create the touchless projection space. In particular, the processor 220 tracks movement of an object within the touchless projection space 220. In such regard, the processor 220 projects the sensing space away from the display 122 and above the keypad 111. The processor 116 can set activation bounds within the sensing space such that only movement within the touchless projection space 220 is considered. Movement outside of the touchless projection space can be disregarded. The processor 116 effectively carves out a portion of the sensing space 210 to create the touchless projection space 220 within which a user can acquire touchless control of an object. Moreover, within this touchless projection space, the processor 220 can assign boundaries to identify where a finger will acquire or release a control.

In one aspect, projecting the sensing space away from the keypad 111 allows users to type without unintentionally acquiring control of an object, such as the cursor 124. If the processor 220 did not focus the sensing space 210 to a touchless projection space 220, finger movements in the sensing space, such as typing motion, could cause the cursor 124 to move. The processor 116 provides control for mitigating unintentional touchless finger actions. In another aspect, projecting the sensing space away from the display 122 provides users an unobstructed view of the display. That is, the fingers will not be in front of the display blocking view of the graphics or images in the display. For example, in a touchscreen application, users are required to touch the objects on the screen; an action which can obstruct the view of the screen. That is, objects in the display can be covered by the finger when the finger is placed over the display. Similarly, in a surface display sensing application wherein a capacitance of the field changes in accordance with an approaching finger, the finger is above the screen; an action which partially or wholly obstructs the view of the screen. In contrast, processor 116 projects the touchless projection space 220 away from the display 122 and the keypad 111 such that finger movement does not obstruct the view of the display 122.

Referring to FIG. 6, a touchless projection space 300 is shown. The touchless projection space 300 corresponds to the region within which a user can move a finger for controlling an object via touchless sensing. The touchless projection space 300 can include boundaries (304, 321, and 314) that demarcate the extent of the touchless projection space and the points at which a control is activated, though is not limited to these boundaries. In one arrangement, the sensing unit 110 can associate boundaries with time of flight distances. For example, a first boundary 304 is a locus of points with each point having a corresponding time of flight distance. In one configuration, the boundaries can be banded regions. In one example, navigation control of a cursor can be enabled when a user moves a finger within a first boundary region 304. In another example, navigation control can be disabled when the user moves the finger outside a second boundary region 314. Notably the second boundary region can also correspond to a banded region along an outer volumetric perimeter of the touchless projection space.

The touchless projection space 300 can originate at the sensing unit 110 and project outward from the sensing unit 110 to a full extent of finger range motion. A finger motion range may be between 3 to 6 inches. For example, referring to FIG. 2, when the user is typing at the keyboard 111, the range of finger motion can correspond to the region between the lowest point 302 which the user can point a finger and the highest point 312 which the user can raise a finger with minimal moving of the hand. A first boundary region 304 can correspond to the lowest point 302, and a second boundary region 314 can correspond to the highest point 312. Notably, various boundary regions and bands can be defined within the finger space region for activating controls. The touchless projection space 300 can be greater than or less than the area shown in FIG. 3 with respect to the user's range of finger movement.

Figure 7:
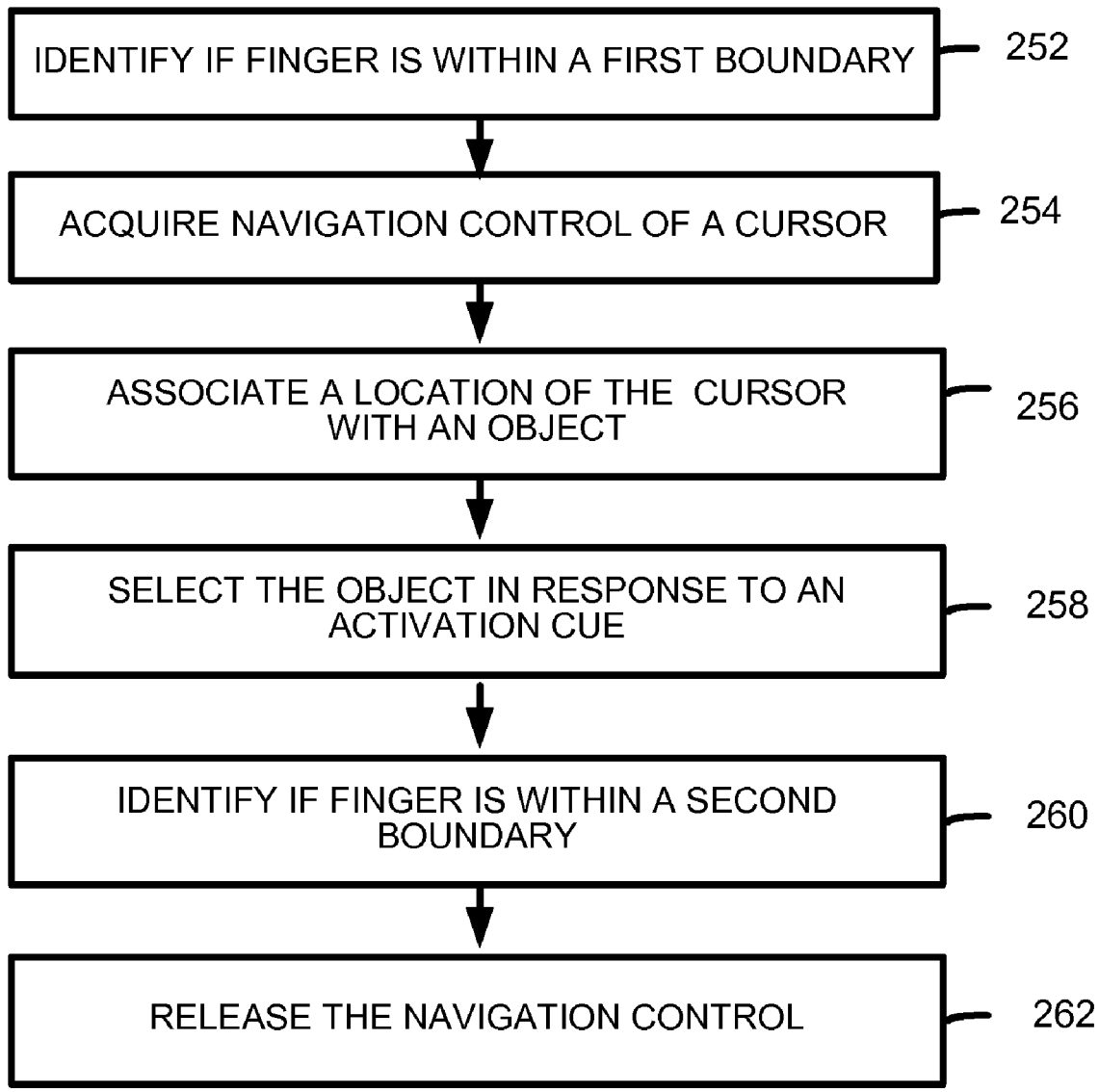
FIG. 7 is a method for touchless cursor control in accordance with an embodiment of the inventive arrangements.

Referring to FIG. 7, a method 250 for cursor control is shown. The method 250 is one implementation of the method 200 shown in FIG. 4. Accordingly, some of the steps previously discussed in FIG. 4 are restated in context of method 250. Briefly, the method 250 allows a user to efficiently navigate a cursor by performing touchless finger inward and touchless finger outward movements. For example, the finger can skip into and out of the sensing space for controlling an object. This allows a user to move an object a greater distance than a length of the sensing space. For example, the dynamic range of finger movement is generally compressed relative to the range of the object movement in the display. Consider, that the range of physical finger movement without moving the hand is less than 6 inches, whereas the size of a screen is typically 19 inches or more. If the entire span of 6 inches is mapped to the width of the display, small finger displacement errors would produce large object movement variations. The method 250 allows a user to move an object across a long distance, without mapping the range of finger movement to the entire range of the display. The method 250 can be performed when the distance for moving the object under touchless control exceeds a range of finger motion. The method 250 can also be practiced with more or less than the number of steps shown.

At step 252, the processor 116 can identify if the finger is within a first boundary. For example, referring back to FIG. 6, the user can gain control when the finger penetrates boundary 304. At step 254, the processor can provide navigation control. For example, referring back to FIG. 1, the user can move the cursor 124 in accordance with finger movement in the touchless projection space. At step, 256, the location of the cursor can be associated with an object. For example, the user may position the cursor 124 over a menu item in the display. At step 258, the object can be selected in response to an activation cue. For example, the user may issue a forward projecting motion to perform a single click on the object to select the object. Upon selecting the object, the user can move the object in accordance with touchless finger movements. At step 260, the processor 116 can determine if the finger is within a second boundary. For example, referring to FIG. 6, the second boundary can correspond to outer boundary 314. At step 262, the processor can release navigation control. For example, consider that the user has acquired an object and moved the object a distance from left to right corresponding to a full range of finger motion from left to right. The user can retract the finger at the far right and leave the object at the current position. The user can then reposition the finger at the far left, enter the sensing field, acquire control of the object, which is at the last position of the object, and move the object again to the right in accordance with the full range of finger motion. The user can retract the finger, leave the object at the current position and repeat the process. This allows the user to move the object over greater distances than the distance of the sensing space. Without the processor 116 performing the control logic for identifying first and second boundaries, the user would only be moving the object back and forth over the same area.

In the foregoing, a brief description of the operation of the sensing unit 110 is provided. Briefly, the touchless projection space 220 discussed in FIG. 5 corresponds to a region within which a reflected high energy pulse can be detected. The touchless projection space can be a function of an emitted pulse strength. The in-line sensing element 113 can include at least one transmitter 342 for emitting a pulse, and at least one receiver 341 for detecting a reflection of the emitted pulse. Multiple transmitters and receivers can be included for increasing signal resolution which are herein contemplated. In one embodiment, the transmitter and receiver can be ultrasonic elements. The transmitter and receivers can be the same for providing dual transmit and receive functions. In another arrangement, the sensing element can be an array of micro acoustic microphones or micro speakers for transmitting and receiving audio signals. In another arrangement, the sensing element can be CCD camera elements or MEMS camera elements for receiving light. The in-line sensing element 113 can employ pulse-echo detection to estimate a range and position of an object within the touchless projection space 220. The transmitter 342 can emit a pulse shaped signal that reflects off the object and that can be detected by the receiver 341. The detector 112 can identify a location and movement of the object. The sensing unit 110 can include additional processing logic such as thresholds, comparators, logic gates, clocks, and the like for detecting an object's motion. The sensing unit 110 calculates a position of the object causing the reflection by solving a set of geometric equations.

Figure 8:
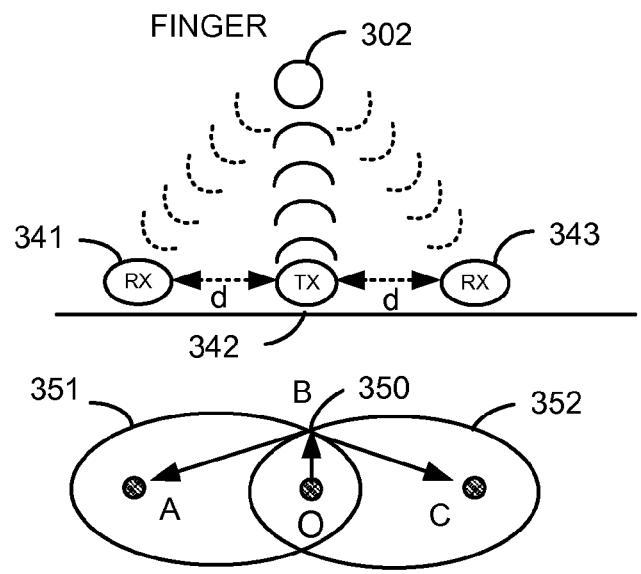
FIG. 8 is a depiction for pulse-echo detection in accordance with an embodiment of the inventive arrangements.

FIG. 8 illustrates one example of a configuration that employs one transmitter 342 and two receivers (341 and 343) for tracking a finger 302 in the touchless projection space 220 using pulse-echo detection. The principles of operation for a single transmitter and two receivers can be applied to multiple transmit and receive elements. In practice, the transmitter 342 can emit a pulse which propagates outward and reflects off the finger 302. A first reflection can be captured by receiver 341, and a second reflection can be captured by receiver 343. The round trip distance between the time the pulse was transmitted and received is referred to as the "time of flight" (TOF). As shown, a first TOF 351 can be described by the path OBA, and the second TOF 352 can be described by the path OBC (O is the transmitter 341, A is receiver 342, B is the location of the finger 302, and C is receiver 343). Notably, the TOF can be anywhere along a loci of points specified by an ellipse. The intersection of the points identifies the location of the finger 302. Each transmit and receive pair can produce one TOF. The timer 114 can calculate the TOF at each receiver for each pulse transmitted. The processor 116 can create boundaries for activation cues based on TOF measurements.

Figures 9, 10:
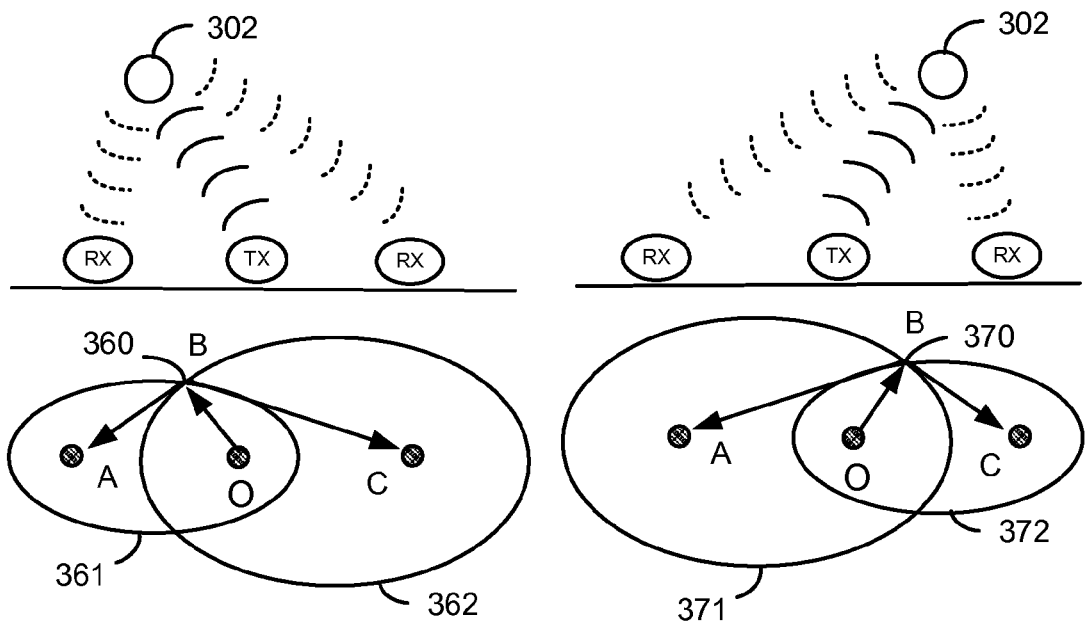
FIG. 9 is another depiction for pulse-echo detection in accordance with an embodiment of the inventive arrangements.
FIG. 10 is yet another depiction for pulse-echo detection in accordance with an embodiment of the inventive arrangements.

As shown in FIG. 8, the first TOF 351 and the second TOF 352 are approximately equal. In such regard, the finger 302 is at a location that is equi-distant to both receivers, which is the center. The processor 116 can determine the height above the sensing unit from the TOFs. As another example, as shown in FIG. 9, the finger 302 is to the left of the transmitter 341. Accordingly, the first TOF 361 is less than the second TOF 362. The processor 116 can identify the location of the finger 302 at the intersection 360 of the TOF ellipses, by solving for the intersection of a series of quadratic equations. As another example, shown in FIG. 10, the finger 302 is to the right of the transmitter 341. In this case, the first TOF 371 is greater than the second TOF 372. The processor 116 can identify the location of the finger 302 at the intersection 370 of the TOF ellipses, by solving for the intersection of a series of quadratic equations.

In another arrangement (not shown), a single transmit and receive pair in the in-line sensing element 113 calculates a first range (e.g. distance) of an object in the touchless projection space. A first transmit and receive pair on an x-axis estimates a longitudinal range of the object (e.g. finger). A second pair, arranged separately from the first pair, estimate a second range. The second pair estimates a latitudinal range of the object (e.g. finger). Accordingly, the two range measurements establish a position (e.g. location) of the object causing the signal reflection by mathematically combining the geometrically related range measurements. For example, the first range measurement establishes a x-coordinate and the second range measurement establishes a y-coordinate. The location of the object is then determined to correspond to the point (x,y) in a single plane. For example, the plane will be oriented in the direction of the first and second paired ultrasonic elements. Accordingly, a third pair can produce a range measurement in a third direction thereby establishing a three-dimensional coordinate system (x,y,z) if the first, second, and third range measurement projections are orthogonal to one another. Notably, the sensing unit 110 can contain multiple sensing elements positioned and arranged in various configurations for receiving range measurements in varying directions for calculating the location of the object. The paired transmit and receive elements can be on a same principal axis or a different principal axis. The sensing unit can also employ beam forming techniques for estimating the objects location.

Figures 11, 12, 13:
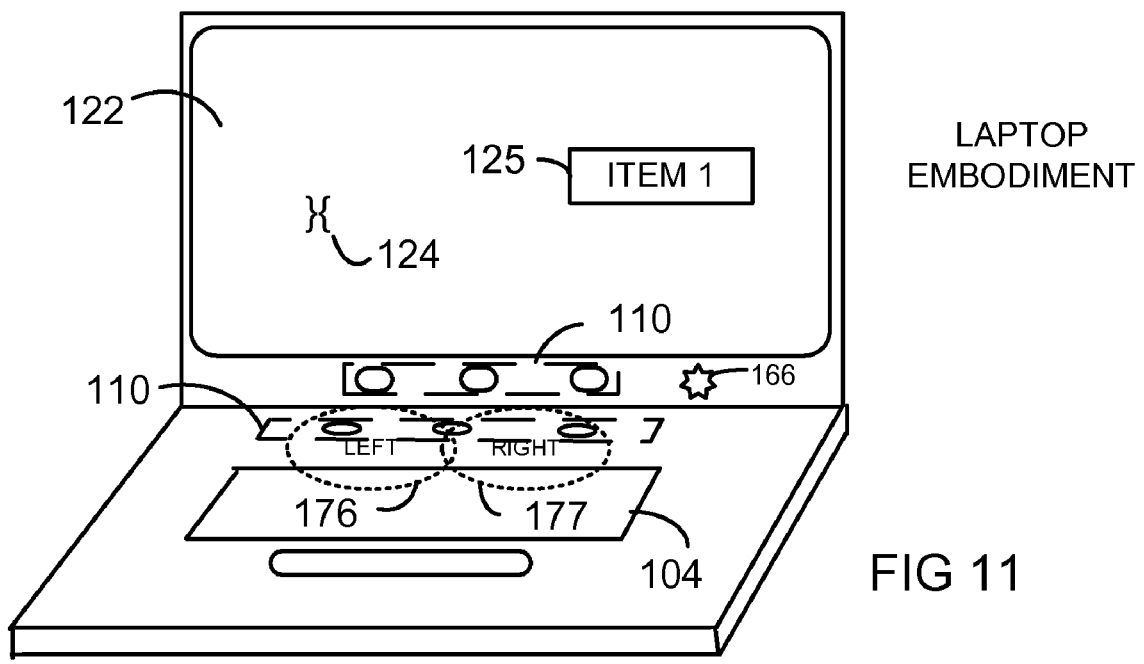
FIG. 11 is an illustration of a laptop providing touchless control in accordance with an embodiment of the inventive arrangements.
FIG. 12 is a set of activation cues for enabling touchless control in accordance with an embodiment of the inventive arrangements.
FIG. 13 is a set of activation cues for disabling touchless control in accordance with an embodiment of the inventive arrangements.

Referring to FIG. 11, the sensing unit 110 is shown in the context of a laptop embodiment. The sensing unit 110 can be integrated within the laptop, or mounted flush with a face of the laptop, for allowing the laptop flip top to close. The in-line sensing element 113 can be exposed between the numeric keys and the function keys on the keyboard 111, just above the function keys of the keyboard 111, on the bottom of a display, or oriented below the display. In general, a user typing at the keyboard 104 can extend and move the finger within a maximum range of finger motion approximated by an ellipse having a volumetric radius under 10 to 12 inches. The user can move the finger within the touchless projection space without moving the hands away from a normal typing position. The timer 114 determines a time window for which an activation cue, such as the positioning of a finger, is considered. For example, when a user intentionally places a finger directly above the in-line sensing element 113 for 1 second, the sensing unit 110, timer 114, together identify the position of the finger as a signal to commence a control, handled by the processor 116, such as the enabling of a navigational control to move a cursor 124 on the display 122. In one arrangement, the detector 112, timer 114, and processor 116 can be integrated with the in-line sensor element 113, with the keyboard 111, or with the computer 125. Accordingly, the sensing device 110 can be a chip such as an Application Specific Integrated Circuit (ASIC) that is operatively connected to the computer or another processor. In another arrangement, the components of the sensing device 110 can be entirely in software on a Digital Signal Processor (DSP). In another arrangement, the sensing device 110 can be a computer accessory that mounts to the keyboard, or any other communication device.

As discussed in FIG. 8, the sensing unit 110 can determine a location of the finger using time of flight measurement. The processor 116 can identify whether the location of the finger is within a first boundary region, or outside a second boundary region for activating a control. The boundary regions can correspond to time of flight measurements. When the finger is actively navigating the cursor 124 within the touchless projection space, the detector 112 can also identify touchless controls the user initiates within the touchless projection space. For example, the user can use the right finger 187 to navigate a cursor 124 and the left finger 186 to control a mouse behavior such as a single click. As an example, referring to FIG. 12, the processor 116 can recognize a click by a forward accelerated finger movement 390, or a downward accelerated finger movement 392, for example as if pointing to the object, or pushing down on a button. The steps 390 and 392 can also be used to acquire a control, such as a menu item on the display 122. Referring to FIG. 13, the processor 116 can recognize a release request to disable control by a backward accelerated finger movement 394, or an upward accelerated finger movement 396. The steps 394 and 396 can also be used to release a control, such as a menu item on the display 122. The detector 112 keeps account of touchless control actions when the finger is within the touchless projection space. Understandably, the user generally moves the cursor to perform some sort of action such as minimizing a window, sending an email, typing a message, opening a web page or any other user interface control.

In practice, an activation cue can be invoked when the cursor is overlaid on the object, such as a user interface component. The activation cue can be one of a single click, a double click, a scroll, a hold, or a button press. Accordingly, the detector 112 keeps track of such information for identifying whether the user has performed an activation cue can within the touchless projection space. The processor 116 can extend the touchless projection space to a greater radius when the detector 112 determines prolonged active movement within the touchless projection space. The processor 116 can adjust a sensitivity based on a position of the finger and a time length of the finger at a position. Adjusting the sensitivity changes a touchless projection space. In one example, the processor 116 increases the transmit pulse intensity to broaden the touchless projection space. Accordingly, the processor 116 decreases the transmit pulse intensity to lessen the touchless projection space. The processor 116 can also change the sensitivity in software to expand or shrinking the touchless projection space. For example, the detector 112 adjusts a sensitivity by linearly increasing the time of flight value corresponding to the locus of points along the boundary for extending the boundaries. Notably, the detector 112 decreases the boundaries by decreasing the time of flight values associated with the boundary.

Figure 14:
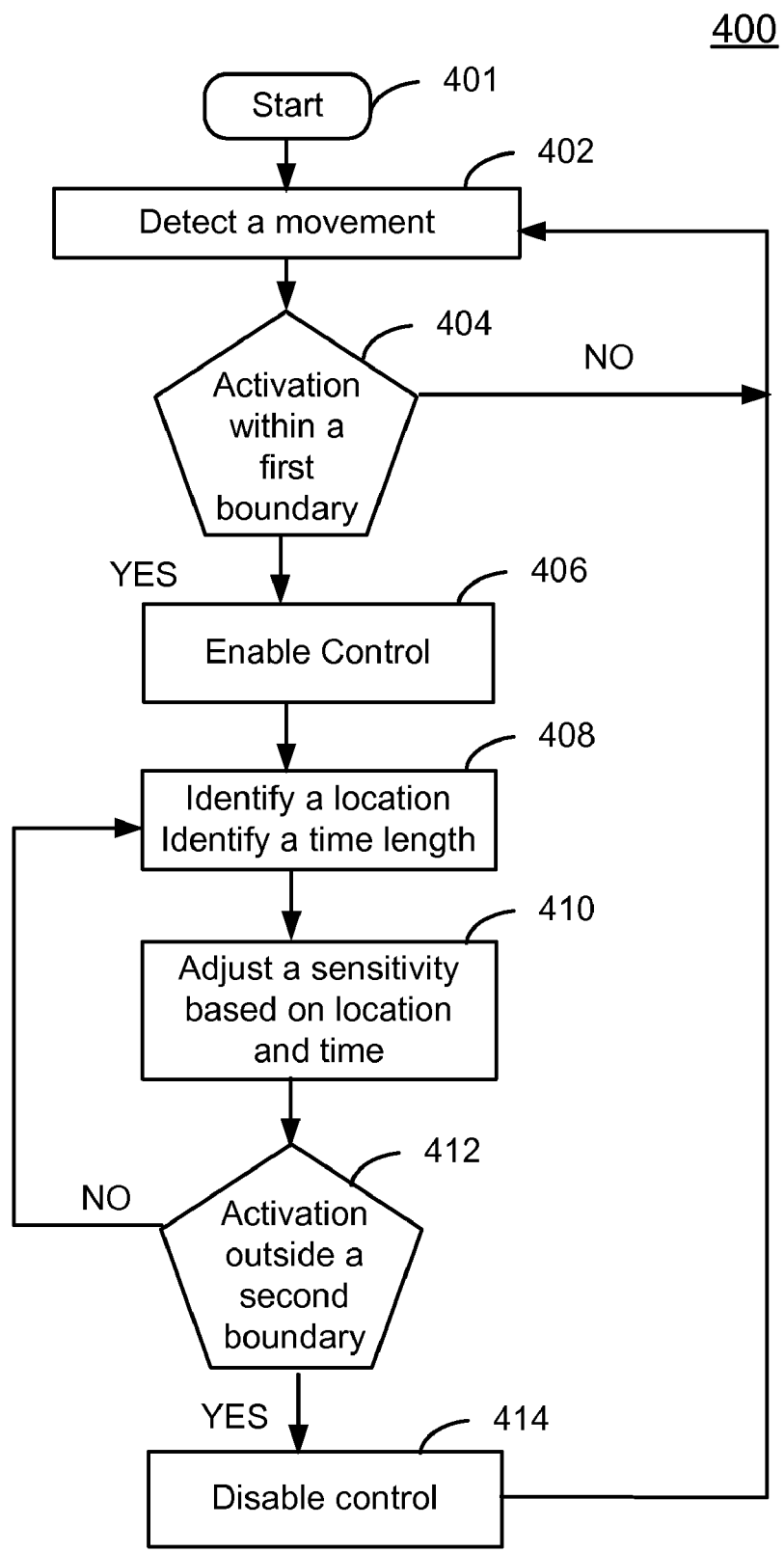
FIG. 14 is a flowchart for activating a touchless control in accordance with an embodiment of the inventive arrangements.

Referring to FIG. 14, a flowchart 400 for activating a touchless control is shown. When describing the flowchart 400, reference will be made to FIGS. 1, 6 and 11, although it must be noted that the flowchart 400 can be practiced in any other suitable system or device. Moreover, the steps of the flowchart 400 are not limited to the particular order in which they are presented in FIG. 9. The flowchart can also have a greater number of steps or a fewer number of steps than those shown in FIG. 9.

At step 401, the method 400 can begin. At step 402, a movement can be detected. For example, referring to FIG. 1, a user typing at the keyboard 111 can temporarily pause from typing and raise a right finger 187 within the finger space region 177. Alternatively, the user can raise a left finger 186 over the finger space region 176. The sensing unit 110 awaits at least one signal reflection, and upon receipt, detects a finger movement. At step 404 an activation within a first boundary is evaluated. For example, referring to FIG. 1, the detector 112 determines if the finger 187 is located at a position within a first boundary 304. When the user positions a finger 302 within the first boundary region 304, the sensing unit 110 detects movement and the detector 112 identifies an activation cue. Notably, the activation cue includes a temporal attribute to ensure that an activation cue was intentional. The timer 114 can set a time length of 1 second such that the detector 112 associates the finger placement with an activation cue. The time length can be predetermined and can vary in accordance with a user preference. For example, the user may position the finger within 1 inch of the sensing unit for a time length of 1 second, thereby satisfying the first boundary position criterion. The user leaves the finger within the first boundary region for at least 1 second before the detector 112 identifies the movement as an activation cue.

At step 406, a control can be enabled if an activation cue is identified. For example, referring to FIG. 6, the user positions the finger 302 within the first boundary region 304 for a predetermined amount of time to create the activation cue, i.e. the user intentionally positions the finger within a particular region for a predetermined amount of time to take control of the cursor for moving the cursor 124 on the display 122. If the detector 112 determines that the finger is within the correct region (e.g. the first boundary of the touchless projection space) and the timer 114 determines that the finger positioning has satisfied the time requirements of an activation cue, the processor 116 enables a navigation control. When the detector 112 identifies an activation cue, the processor 116 enables a navigation control of the cursor 124 on the display 122. The processor 116 can implement a threshold mechanism for cursory control such that control of the cursor is granted when an intentional action, such as the activation cue, is initiated to assume control of the cursor. Else, a sensing unit that moves the cursor 124 in accordance with a finger movement, and having no control mechanisms, would continually move the cursor as the user is typing. The sporadic movement of the cursor while the user is typing may be considered an annoyance by a user. Also, a user does not generally navigate a cursor during normal the typing of text. The activation control method 400, allows a user typing at the keyboard to take control of a cursor under an established control condition, that is, when the user intentionally gestures an activation cue, such as the positioning of a finger at a particular location for a predetermined amount of time.

In one arrangement the sensing unit 110 can include an indication element 166 which informs a user of the status of the activation cue. For example, the indication element can be a light emitting diode (LED), light contrast display (LCD), a color stick, a software graphics display, or a voice responder for providing a visual or auditory cue back to the user, respectively. In the particular example of a LED, the LED lights up when the activation cue is detected. In another aspect, the intensity of the LED slowly increases as the time length approaches the predetermined time length and begins to blink when an activation cue is detected. In another configuration the indication element 166 changes color as a function of an object's position. The indication element informs the user that the user can commence control of the cursor 122 thereby removing uncertainty as to when control is granted.

Returning back to step 408, a location and a time length can be identified. For example, referring back to FIG. 1, the finger can be positioned within a boundary of the touchless projection space for a predetermined period of time. After the detector 112 identifies an activation cue the user can proceed to move the finger to navigate a cursor on the display. The finger can move around within the touchless projection space demarcated by a first boundary 304 and a second boundary 314 for controlling a cursor. For example, the sensing unit 110 identifies a position of the finger within the touchless projection space and moves the cursor 124 in accordance with the coordinates calculated by the sensing unit 110. When the finger exceeds a second boundary the handle to the navigation control can be relinquished. Notably, the second boundary movement approximately represents the maximal extent of general finger movement when the hands are stationed in the normal typing position. Notably, the user can change the size of the touchless projection space to expand or compress the touchless projection space. For example the user may wish to extend the touchless projection space beyond a normal hand typing position. The user may want to elevate a hand and control the cursor rather than leaving the hands in a normal default typing position. Accordingly, the detector 112 determines if the user wants to change the touchless projection space after the activation cue has been detected.

At step 410, a sensitivity of the sensing unit 110 can be adjusted based on the measured time and location. For example, the user can leave the finger within the first boundary region for a time period greater than the time length required in order to satisfy the activation cue for assuming control of the cursor. Notably, the detector 112 begins to expand the region the longer in time the user leaves the finger in the same position when at the location of the activation cue. The detector 112 can be manually configured to not adjust the sensitivity or extent of the boundary regions. The step of adjusting the sensitivity is optional. The detector 112 expands the touchless projection space by increasing the intensity of the transmitting pulse energy in the sensing unit 110. The higher the pulse energy, the greater the touchless projection space. Notably, the sensing unit, when activated, produces a transmit pulse with an energy level sufficient to cover the touchless projection space (i.e. 176 or 177). Accordingly, the sensing unit, when not-activated, reduces the transmit pulse energy such that movement within the touchless projection space does not produce a reflection of sufficient strength to be detected by the detector 112.

In another arrangement, the processor 116 keeps the detector 112 disabled unless an activation cue is received. The processor 116 enables the detector 112 when an activation cue is detected and turns the detector 112 off when the finger leaves the touchless projection space. The indication element 166 indicates to the user that the touchless projection space is expanding (e.g. strength of transmitted pulse) either by increasing the blinking rate or changing the blinking style. When the user moves the finger away from the location of the activation cue (e.g. within the first boundary 304) the touchless projection space no longer changes. Accordingly, the user expands the touchless projection space by leaving the finger at the activation cue position longer.

At step 412, an activation outside a second boundary can be evaluated. For example, referring to FIG. 6, the user may move the finger 312 outside a second boundary 314. The second boundary can demarcate the maximal range of finger extent when the hand is at a normal typing position. When the finger is within the first boundary 304 and the second boundary 314, movement of the finger results in movement of the cursor 124. The user can move the cursor 124 in accordance with the finger movement when the finger is within the touchless projection space between the first boundary and second boundary.

At step 414, control can be disabled. Referring back to FIG. 2, when the user moves the finger outside the second boundary 314, cursory navigation control ceases and the cursor remains at the last position when control was enabled. The user can the move the finger back in the touchless projection space between the first 304 and second boundary 314 without gaining control of the cursor, and hence, without moving the cursor. Understandably, this is beneficial because it allows the user to bring the finger back in the touchless projection space without moving the cursor from the last position. Only when the user brings the finger back to within the first boundary region 304 (or band), does the detector 112 allow the user to regain control of the cursor. Accordingly, the user can resume control of the cursor at the last position thereby providing continuous movement of the cursor 124 around the display 122.

Figure 15:
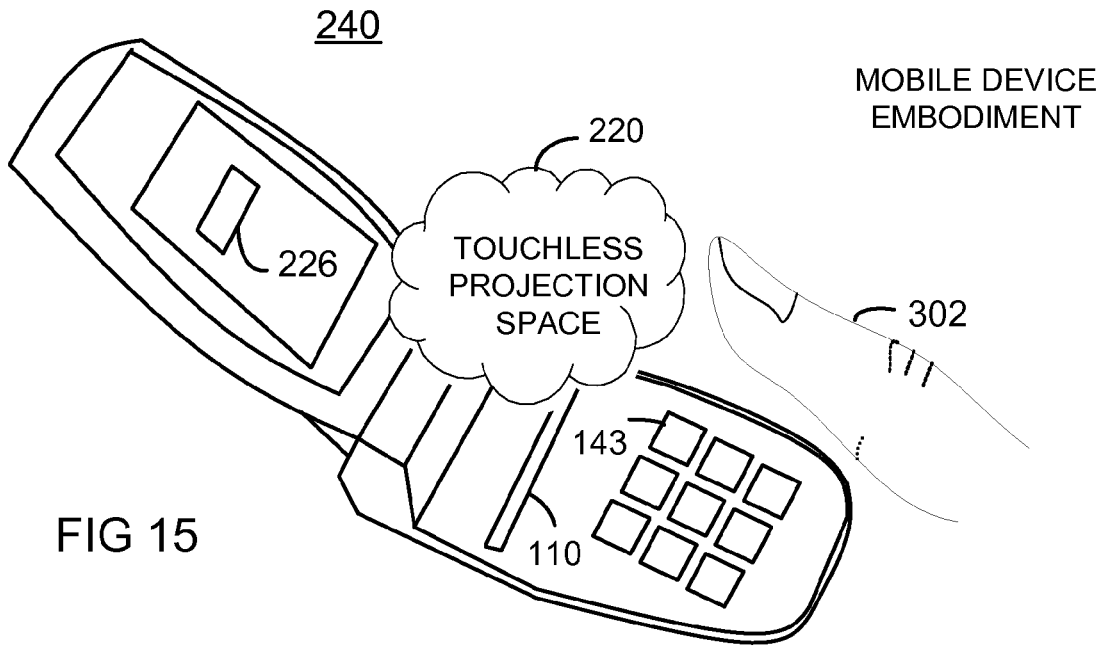
FIG. 15 is an illustration of a mobile device providing touchless control in accordance with an embodiment of the inventive arrangements.

Referring to FIG. 15, another exemplary application for activating touchless control is presented. As shown, the sensing unit 110 can be integrated with a mobile device 240. In one arrangement, the sensing unit 110 can be placed above a keypad 143 of the mobile device 240. The sensing unit 110 can create the touchless projection space 220 described in FIG. 5. The touchless projection space 220 can be over the keypad 143 and in front of the display. The touchless projection space 220 is not limited to the arrangement shown. For example, the touchless projection space 220 can be above the keypad, above the display, or above another portion of the mobile device 240. The touchless projection space 220 provides a virtual interface to the mobile device. A user can position a finger 302 or a thumb within the touchless sensing field 108 to handle one of more controls of the mobile device, such as a menu item 226. Notably, the sensing unit 110 and the associated components can be integrated within the mobile device 240. For example, the detector 112, the timer 114, and the feedback unit 116 can be a chip such as an Application Specific Integrated Circuit (ASIC) that is operatively connected to the processor of the mobile device. In another arrangement, the components can be entirely in software and coded on a Digital Signal Processor (DSP) within the mobile device. Moreover, the sensing elements 166 may comprise microphone elements already provided on the mobile device 240.

Figure 16:
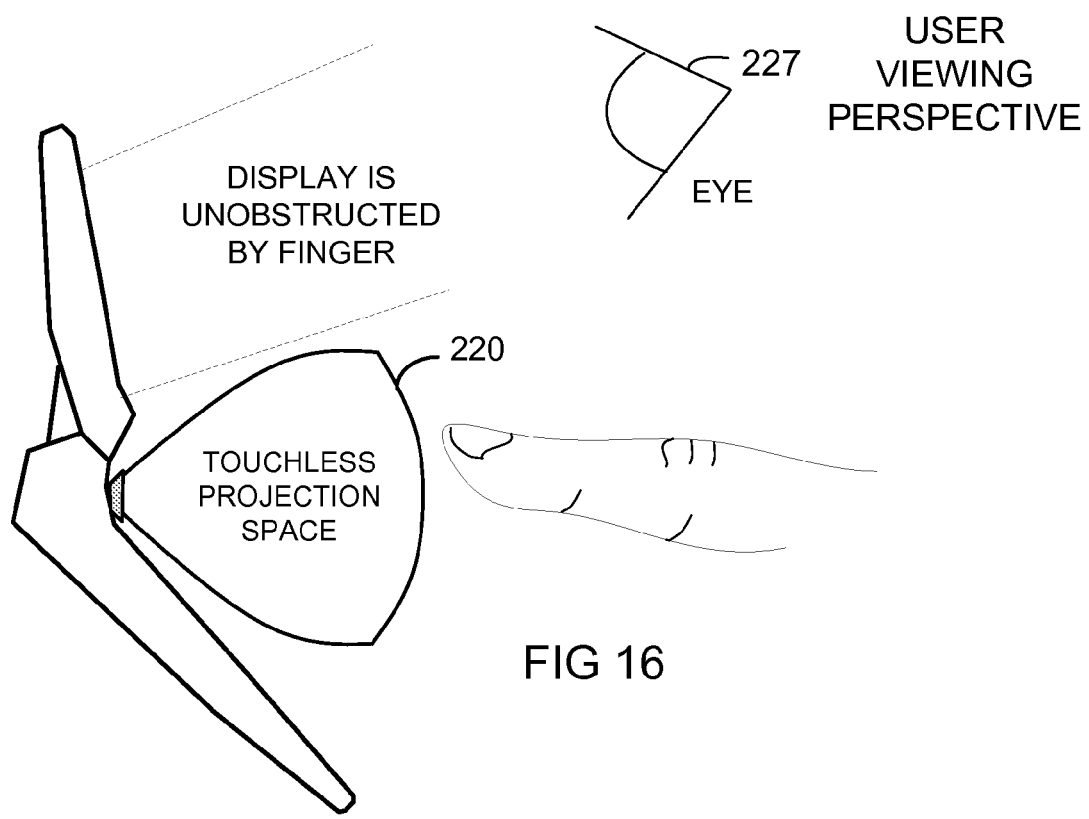
FIG. 16 is a side view of the touchless projection space and the mobile device of FIG. 15 in accordance with an embodiment of the inventive arrangements.

Referring to FIG. 16, a side view of the mobile device 240 is shown. The side view also shows a side view of the touchless projection space 220 generated by the touchless sensing unit 110. Notably, the display of the mobile device is unobstructed from finger movement in the touchless projection space 220. As described in FIG. 5, the processor 116 focuses the touchless sensing field 210 to project the touchless projection space 220 in a direction and orientation away from the display. This provides the user an unobstructed view of the display when performing touchless finger activation cues in the touchless projection space 220. That is, the fingers will not be in front of the display blocking view of the graphics or images in the display. From a user viewing perspective 227, the finger will not interference with the visual elements on the display. For example, in a touchscreen application users are required to touch the objects on the screen; an action which obstructs the view of the screen. Similarly, in a surface display sensing application, the finger is above the display; an action which partially or wholly obstructs the view of the display. In contrast, processor 116 projects the touchless projection space 220 away from the display such that finger movement does not obstruct the view of the display 122.

Figure 17:
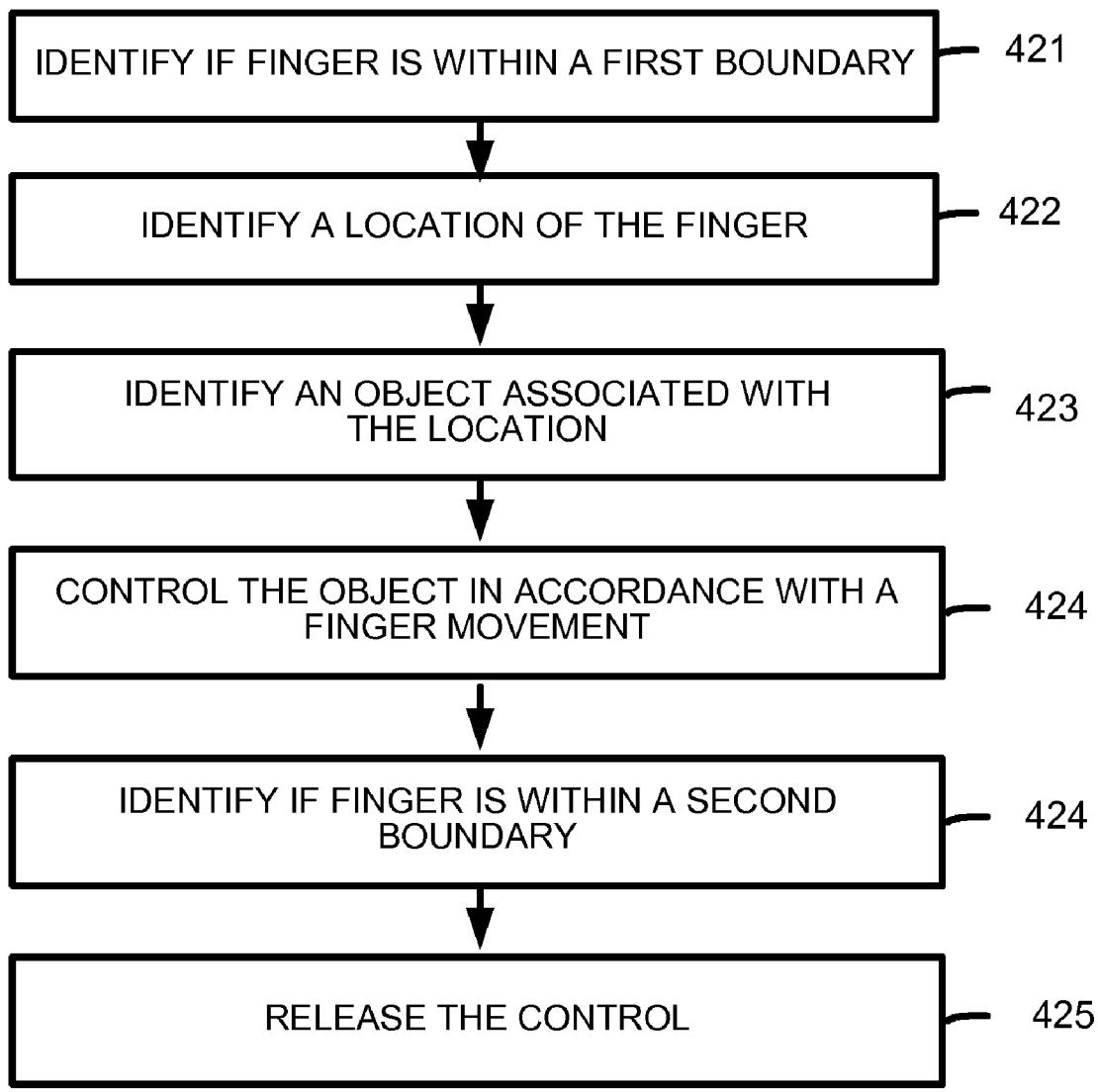
FIG. 17 is a method for touchless operation of a user interface control in accordance with an embodiment of the inventive arrangements.

Referring to FIG. 17, a method 420 for touchless operation of a user interface control is shown. The method 420 can be practiced with more or less than the number of steps shown. When describing the method 420, reference will be made to FIGS. 1, 6, and 15. At step 421, a finger can be identified within a first boundary. For example, referring to FIGS. 1 and 6, the processor 116 can determine if the finger 302 is within the first boundary 304 by evaluating a time of flight (TOF) measurement. The detector 112 can determine if the TOF is below the boundary 304. At step 422, a location of the finger can be identified. The location can be determined as a function of absolute TOF measurements and differential TOF measurements. For example, referring to FIGS. 1 and 6, the processor 116 can calculate a position and displacement of the finger 302 in the touchless projection space 220. The processor 116 can map positions and displacements within the touchless projection space 220 to locations within the display. For example, referring to FIG. 15, a finger at one position in the touchless projection space 220 can map to a location in the display. At step 423, an object associated with the location can be identified. The object may be an object visible in the display such as a user interface control. As one example, the user interface control can be a media control for audio such as music or voice mail. As on particular example, the user interface control can be volume knob, a song selector, a voice mail selector, or a contacts list. Notably, the location of the object in the display does not coincide with a location of the finger in the touchless projection space 220. At step 424, the object can be controlled in accordance with the finger movement. For example, the user can issue a forward projecting finger movement to acquire a touchless control or select an object. For example, referring to FIG. 6, the user can penetrate a boundary 304 to acquire control. Upon acquire or selection, the user can adjust the control. For example, the user can move the finger in a clockwise motion to increase a volume, or a counter clockwise movement to decrease a volume. At step 425, a determination can be made if the finger is within a second boundary. A boundary can be an absolute location or a relative movement. In the latter, a boundary can be a change in velocity, such as an accelerated movement. A user can relinquish touchless control when the finger is identified in a second boundary. As one example, referring to FIG. 6, the user can retract the finger from the outer boundary 314. Alternatively, the user can quickly retract the finger to relinquish touchless control, if the second boundary is based on changes in velocity. At step 425, the control can be released. Notably, the touchless control is released upon identifying if the finger is within the second boundary.

Figure 18:
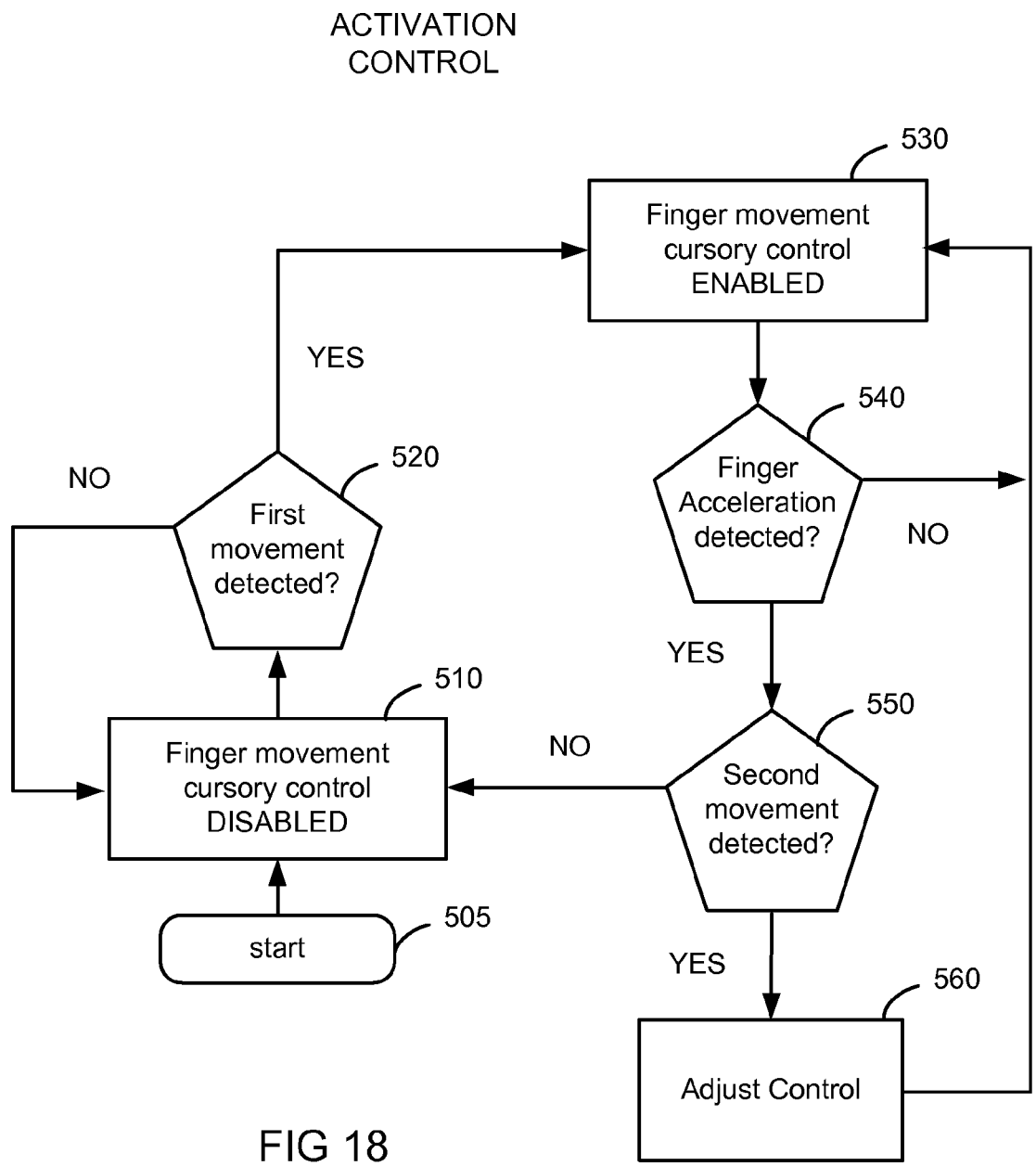
FIG. 18 is a flowchart for activating a touchless control in accordance with an embodiment of the inventive arrangements.

Referring to FIG. 18, a flowchart 500 for activation control is shown. Briefly, the flowchart 500 determines if the finger moves faster or slower than a threshold speed when performing an activation cue. If the speed is greater than an upper threshold speed, touchless control can be acquired in response to the activation cue. If the speed is less than a lower threshold speed, touchless control can be released in response to the activation cue. The acquiring and the releasing can also depend on the detection of an activation cue. As one example, the flowchart 500 depicts when a forward accelerated finger movement can be an activation cue to enable touchless control of the object, and when a backward accelerated finger movement can be an activation cue to disable touchless control of the object.

At step 505, the flowchart 500 can begin. At step 510, finger movement cursory control is initially disabled. At step 520, the processor 116 can determine if a first finger movement is detected. If a finger movement is detected, the flowchart 500 can proceed to step 530, If not, the flowchart returns to 510, and the processor 116 awaits detection of a first movement. At step 530, finger movement cursory control is enabled. For example, referring back to FIG. 1, the user can navigate the cursor 124 in accordance with touchless finger movements. The user can also navigate to different objects in the display, or control objects in the display. At step 540, the processor 116 can identify finger acceleration. If no acceleration is detected, the processor 116 can continue to control the cursor 124, or object, at step 530. If the processor 116 detects accelerated movement, at step 550, the processor can check for a second finger movement. The second finger movement may be a direction, such as up, down, left, or right. As one example, an accelerated down movement can be an activation cue to select the object, such as a touchless pressing of an enter key. As another example, an accelerated upward movement can be an activation cue to discard, or release, an object, such as a pointing away movement. The processor 116 can identify various activation cues in response to detecting an accelerated movement. If the activation cue relates to a control adjustment, at step 560, the processor can adjust the touchless control. For example, the processor 116 can perform a single click, issue a select command, or adjust a setting of an object under touchless control. As another example, the processor 116 can identify a forward accelerated finger movement as an activation cue to enable touchless control of the object, or a backward accelerated finger movement as an activation cue to disable touchless control of the object. The processor 116 can continue to step 530 for touchless control. If the processor 116 does not identify the activation cue at step 550, the control can be disabled at step 510, and the process can start again.

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

While the preferred embodiments of the invention have been illustrated and described, it will be clear that the embodiments of the invention is not so limited. Numerous modifications, changes, variations, substitutions and equivalents will occur to those skilled in the art without departing from the spirit and scope of the present embodiments of the invention as defined by the appended claims.

What is claimed is:

1. A non-scanning ultrasonic system for touchless control comprising:
    an ultrasonic touchless sensing unit, wherein said ultrasonic touchless sensing unit detects at least one activation cue from a finger in a three-dimensional ultrasonic touchless sensing space; and
    a controller communicatively coupled to said sensing unit, wherein said controller activates and adjusts a touchless control according to the finger's location and acceleration in one of a plurality of elliptic banded boundary regions of the three-dimensional ultrasonic touchless sensing space in response to said activation cue;
    where the ultrasonic touchless sensing unit:
    acquires the touchless control responsive to detecting a first pause or first accelerated finger movement in a first inner banded elliptical boundary region of the three-dimensional ultrasonic touchless sensing space, and
    releases the touchless control responsive to detecting a second pause or second accelerated finger movement in a second outer banded elliptical boundary region of the three-dimensional ultrasonic touchless sensing space.

2. The system of claim 1, wherein said ultrasonic touchless sensing unit further includes:
    a detector, wherein said detector identifies a location, movement and velocity of the finger producing said activation cue;
    a timer cooperatively connected to said detector, wherein said timer establishes a time window of receiving said activation cue; and
    a processor cooperatively connected to said detector, wherein said processor uses the time window to identify the pause or the accelerated movement in the three-dimensional ultrasonic touchless sensing space;
    compresses or expands a dynamic range of the touchless control according to the finger's acceleration in a banded boundary region; and
    maps the range of the touchless control according to the banded boundary region and the finger's velocity.

3. The system of claim 1, further comprising:
    a display cooperatively connected to said controller, wherein said display visually presents a handle to an object under touchless control,
    an indication element communicatively coupled to said detector, wherein said indication element informs a user that an activation cue has been identified
    wherein the processor maps the range of the finger's movement to a visual range of the display.

4. The system of claim 3, wherein said object is a cursor and said handle is a navigation and selection control of said cursor.

5. The system of claim 1, wherein said touchless sensing unit is an array of ultrasonic sensors, imaging elements, charge coupled devices (CCD), camera elements, or laser elements.

6. The system of claim 1, wherein the processor focuses the touchless sensing field to produce a touchless projection space that includes at least one banded boundary for activating said activation cue where the first inner boundary region and the second outer boundary region are separated.

7. The system of claim 6, wherein the sensing unit projects the touchless projection space away from a surface of a display, such that a center of the touchless projection space does not coincide with a center of the display.

8. The system of claim 1, wherein said indication element is one of a light emitting diode, a light contrast display (LCD), a color stick, or a software graphic display.

9. A non-scanning method for touchless control comprising the steps of:
   detecting a finger in a three-dimensional ultrasonic touchless sensing space having a plurality of inner and outer banded elliptical boundary regions;
   identifying a first pause in a first inner banded elliptical boundary region of the three-dimensional ultrasonic touchless sensing space as an activation cue to acquire touchless control;
   identifying a second pause in a second outer banded elliptical boundary region of the ultrasonic three-dimensional touchless sensing space as a second activation cue to release the touchless control; and
   activating or deactivating the touchless control of an object in response to the activation cue,
   where a banded elliptical boundary region is associated with a unique mapping of the finger's acceleration to a dynamic range of the touchless control in that banded elliptical boundary region.

10. The method of claim 9, further comprising:
   focusing the touchless sensing field to produce a touchless projection space in accordance with the finger's acceleration within or across the multiple boundary regions of the three-dimensional ultrasonic touchless sensing space,
   wherein said activation cue is a positioning of the finger within a bounded region of the touchless projection space.

11. The method of claim 9, further comprising the steps of:
   enabling the touchless control upon identifying the activation cue of an accelerated finger movement within a first bounded region of the three-dimensional ultrasonic touchless sensing space; and
   disabling said touchless control upon identifying the activation cue of a decelerated finger movement outside a second bounded region in the three-dimensional ultrasonic touchless sensing space.

12. The method of claim 9, further comprising detecting a length of time the finger is at a location within a bounded region to identify the pause in the three-dimensional touchless sensing space.

13. The method of claim 9, further comprising presenting an indication when a touchless control is enabled or disabled in response to an activation cue.

14. The method of claim 10, further comprising adjusting a sensitivity based on a position of said finger and a time length of said finger at said position, wherein adjusting said sensitivity changes an intensity of the touchless projection space, where the first inner banded elliptical boundary region and the second outer banded elliptical boundary region are not the same.

15. The method of claim 9, wherein a touchless control is a single click, a double click, a scroll, a hold, a select, or a release.

16. The method of claim 10, wherein the step of granting touchless control further comprises associating relative finger movements with activation cues for acquiring and releasing the touchless control.

17. A method for ultrasonic navigation control, the method comprising the steps of:
   generating a three-dimensional ultrasonic touchless sensing space having a plurality of elliptic banded boundary regions;
   enabling a navigation control when a finger is within a first inner banded elliptical boundary region of the three-dimensional ultrasonic touchless space;
   controlling an object in accordance with a movement of at least one finger, when said finger is within a banded elliptical boundary region;
   compressing or expanding the control of the object according to the finger's acceleration in a banded boundary region;
   disabling said navigation control when said finger is outside a second outer banded boundary region of said three-dimensional ultrasonic touchless space; and
   re-enabling said navigation control when said finger returns to a region within said first inner banded elliptical boundary, for controlling said object in accordance with said movement when said finger is within said touchless projection space;
   wherein said object remains at a position where navigation control is disabled and resumes movement when said finger returns to said first elliptical boundary region.

18. The method of claim 15, further comprising:
   identifying a forward accelerated finger movement within said first elliptical banded boundary region as an activation cue to enable touchless control of the object; and
   identifying a backward accelerated finger movement within said first elliptical banded boundary region as an activation cue to disable touchless control of the object.

19. The method of claim 15, further comprising:
   identifying a downward accelerated finger movement in the three-dimensional ultrasonic touchless sensing space as an activation cue to enable touchless control of the object; and
   identifying an upward accelerated finger movement in the three-dimensional ultrasonic touchless sensing space as an activation cue to disable touchless control of the object.

20. The method of claim 15, further comprising increasing an intensity of the touchless projection space in response to detecting a finger within the first inner banded boundary region and in accordance with the finger's acceleration.

* * * * *